| (12) | United States Patent | (10) Patent No.: | US 10,637,928 B2 |
|---|---|---|---|
| | Sugaya | (45) Date of Patent: | \*Apr. 28, 2020 |

(54) COMPUTER SYSTEM, EDGE DEVICE CONTROL METHOD, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 109 days.

This patent is subject to a terminal disclaimer.

(21) Appl. No.: 15/574,924

(22) PCT Filed: Nov. 30, 2016

(86) PCT No.: PCT/JP2016/085570

§ 371 (c)(1),
(2) Date: Nov. 17, 2017

(87) PCT Pub. No.: WO2018/100683

PCT Pub. Date: Jun. 7, 2018

(65) Prior Publication Data

US 2019/0289075 A1    Sep. 19, 2019

(51) Int. Cl.
*H04L 29/08* (2006.01)
*G06N 20/00* (2019.01)
(Continued)

(52) U.S. Cl.
CPC .............. *H04L 67/125* (2013.01); *G06F 9/50* (2013.01); *G06N 20/00* (2019.01); *G06N 99/00* (2013.01); *H04L 12/66* (2013.01); *H04L 41/16* (2013.01)

(58) Field of Classification Search
CPC ....... H04L 67/125; H04L 12/66; H04L 41/16; G06N 20/00
(Continued)

(56) References Cited

U.S. PATENT DOCUMENTS 6,584,502 B1 * 6/2003 Natarajan ........... H04L 41/0213
                                                              709/223
8,560,634 B2 * 10/2013 Twitchell, Jr. ........ H04L 45/586
                                                              709/217
(Continued)

FOREIGN PATENT DOCUMENTS

| JP | 2002-140194 | 5/2002 |
|---|---|---|
| JP | 2007-241718 | 9/2007 |
| JP | 2014-222480 | 11/2014 |

OTHER PUBLICATIONS

Requirement for implementing IoT, NTT, http://www.meti.go.jp/committee/sankoushin/shojo/johokeizai/bunsan_senryaku_wg/pdf/001_04_00.pdf & its English Translation of p. 6-9, p. 1-24, Mar. 28, 2016.

*Primary Examiner* — Michael Won
(74) *Attorney, Agent, or Firm* — Lex IP Meister, PLLC

(57) ABSTRACT

It is an object to provide a computer system, an edge device control method, and a program for improving a processing speed by effectively utilizing edge devices existing in a network. A computer system for controlling edge devices 100 connected to a gateway 200 to perform machine learning detects edge devices 100 connected to the gateway 200, determines a combination of the detected edge devices 100, acquires processing performances of the detected edge devices 100, determines programs for edge device 100 and a program for machine learning based on the determined combination and the acquired processing performances, transmits the determined programs for edge device 100 to the edge devices 100 in accordance with the acquired processing performances, causes the edge devices 100 to execute the programs for edge device 100 in accordance with the acquired processing performances, and causes a predetermined computer to execute the program for machine learning.

9 Claims, 12 Drawing Sheets

(51) Int. Cl.
    *H04L 12/66* (2006.01)
    *H04L 12/24* (2006.01)
    *G06F 9/50* (2006.01)
    *G06N 99/00* (2019.01)

(58) Field of Classification Search
    USPC ........................................ 709/220, 223, 230
    See application file for complete search history.

(56) References Cited

U.S. PATENT DOCUMENTS

| | | | | |
|---|---|---|---|---|
| 8,671,184 | B2* | 3/2014 | Bush | H04L 12/2807 |
| | | | | 709/223 |
| 8,971,341 | B2* | 3/2015 | Ansari | G06Q 30/04 |
| | | | | 370/401 |
| 9,729,401 | B2* | 8/2017 | Gupta | H04L 41/142 |
| 10,289,959 | B2* | 5/2019 | Kakhandiki | G06N 20/00 |
| 2002/0052908 | A1 | 5/2002 | Cho et al. | |
| 2009/0168787 | A1* | 7/2009 | Ansari | H04L 12/66 |
| | | | | 370/401 |
| 2012/0311570 | A1* | 12/2012 | Gandhi | G06F 9/5027 |
| | | | | 718/1 |
| 2016/0299899 | A1 | 10/2016 | Logachev | |
| 2019/0028297 | A1* | 1/2019 | Fairweather | H04L 67/125 |
| 2019/0124156 | A1* | 4/2019 | Nolan | H04L 67/125 |
| 2019/0150134 | A1* | 5/2019 | Kakinada | H04W 72/048 |
| | | | | 370/330 |
| 2019/0163912 | A1* | 5/2019 | Kumar | G06F 21/575 |
| 2019/0182105 | A1* | 6/2019 | Stephens | H04L 41/0672 |
| 2019/0294922 | A1* | 9/2019 | Clark | G06K 9/6254 |

* cited by examiner

FIG. 9

Combination DB

| Type name | Device name |
|---|---|
| Type 1 | TOT-SE01 (tomato temperature sensor)<br>CAM01 (camera)<br>PH06 (smartphone) |
| Type 2 | BB-01 (vinyl house sensor kit)<br>WEBCAM25 (camera)<br>GAL (tablet) |
| ⋮ | ⋮ |

FIG. 10

Program DB

| Type name | Machine learning data set |
|---|---|
| Type 1 | Application for tomato growing<br>Program set F for edge device<br>Machine learning program B for computer |
| Type 2 | Application for cucumber growing<br>Program set V for edge device<br>Machine learning program D for computer |
| ⋮ | ⋮ |

COMPUTER SYSTEM, EDGE DEVICE CONTROL METHOD, AND PROGRAM

TECHNICAL FIELD

The present invention relates to a computer system, an edge device control method, and a program for controlling an edge device connected to a gateway to perform machine learning.

BACKGROUND ART

In recent years, a technique called edge AI (Artificial Intelligence) computing is known. In this technique, machine learning is performed by using edge devices connected to the gateway.

As a system for performing the machine learning, for example, a configuration for arranging edge devices at positions close to edges (various sensor devices) in a conventional public line network, allowing the edge devices to perform processing that requires fast processing speed, and allowing other computers connected to the public line network to perform time-consuming processing such as image analysis and machine learning is disclosed (see Non-Patent Document 1).

PRIOR ART DOCUMENT

Non-Patent Document

Non-Patent Document 1: http://www.meti.go.jp/committee/sankoushin/shojo/johokeizai/bunsan_senryaku_wg/pdf/001_04_00.pdf

SUMMARY OF THE INVENTION

Technical Problem

However, in Non-Patent Document 1, since there is an edge device that does not execute the processing among the edge devices, it is impossible to effectively utilize such an edge device.

It is an object of the present invention to provide a computer system, an edge device control method, and a program for improving the processing speed by effectively utilizing edge devices existing in a network.

Technical Solution

The present invention provides the following solutions.

The present invention provides a computer system for controlling edge devices connected to a gateway to perform machine learning. The computer system includes a detection unit that detects edge devices connected to the gateway, a combination determining unit that determines a combination of the detected edge devices, an acquiring unit that acquires processing performances of the detected edge devices, a program determining unit that determines programs for edge device and a program for machine learning based on the determined combination and the acquired processing performances, a transmitting unit that transmits the determined programs for edge device to the edge devices in accordance with the acquired processing performances, and an executing unit that causes the edge devices to execute the programs for edge device in accordance with the acquired processing performances, and causes a predetermined computer to execute the program for machine learning.

According to the present invention, a computer system for controlling edge devices connected to a gateway to perform machine learning detects edge devices connected to the gateway, determines a combination of the detected edge devices, acquires processing performances of the detected edge devices, determines programs for edge device and a program for machine learning based on the determined combination and the acquired processing performances, transmits the determined programs for edge device to the edge devices in accordance with the acquired processing performances, causes the edge devices to execute the programs for edge device in accordance with the acquired processing performances, and causes a predetermined computer to execute the program for machine learning.

The present invention relates to a computer system, but exhibits the same operations and effects even when being applied to other categories such as an edge device control method, a program, and the like.

Effects of the Invention

According to the present invention, it is possible to provide a computer system, an edge device control method and a program improved in processing speed by effectively utilizing edge devices existing in a network.

BRIEF DESCRIPTION OF THE DRAWINGS

FIG. 9 is a diagram showing an example of a combination database.

FIG. 10 is a diagram showing an example of a program database.

DETAILED DESCRIPTION OF THE EMBODIMENTS

Hereinafter, embodiments for carrying out the present invention are described with reference to the drawings. It is to be understood that the embodiments are merely examples and the scope of the present invention is not limited to the disclosed embodiments

[Overview of Edge Device Control System 1]

Figure 1:
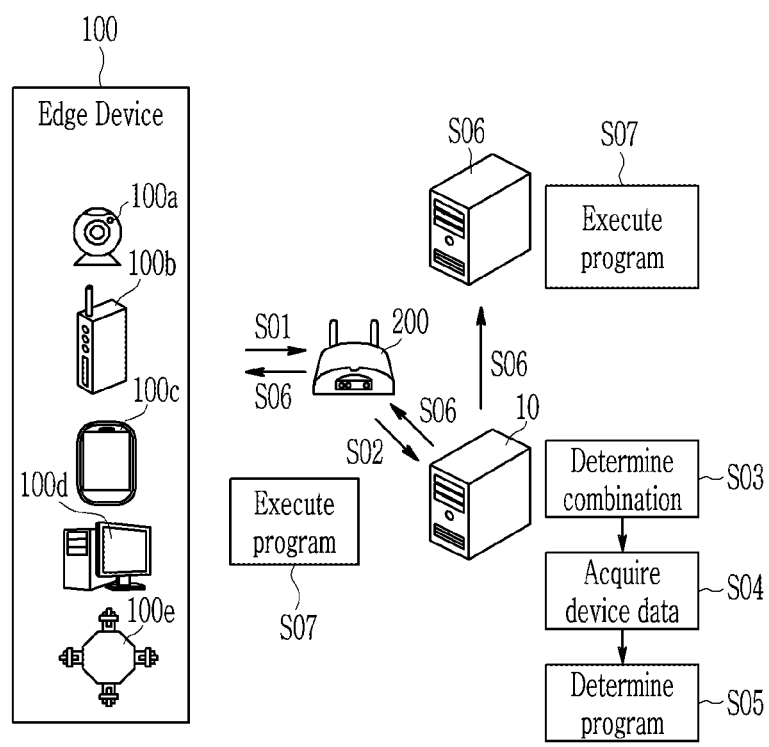
FIG. 1 is a diagram for explaining an overview of an edge device control system 1.

An overview of an embodiment of the present invention is described with reference to FIG. 1. FIG. 1 is a diagram for explaining an overview of an edge device control system 1 which is an embodiment of the present invention. The edge device control system 1 includes a proposal computer 10, edge devices 100 (a network camera 100a, a sensor device 100b, a mobile terminal 100c, a computer device 100d, and a drone 100e), a gateway 200, and a computer 300. The edge device control system 1 is a computer system that controls the edge devices 100 connected to the gateway 200 to perform machine learning.

In FIG. 1, the number of proposal computer(s) 10, the number of edge devices 100, the number of gateway(s) 200, and the number of computer(s) 300 may be appropriately changed. In addition, types of the edge devices 100 may be appropriately changed. Further, the proposal computer 10, the edge devices 100, the gateway 200, and the computer 300 are not limited to existing devices, and may be virtual devices. Furthermore, each process to be described below may be realized by any one or a combination of two or more of the proposal computer 10, the edge devices 100, the gateway 200, and the computer 300.

The proposal computer 10 is a computer device that is connected to the gateway 200 and the computer 300 so as to perform data communication.

The edge device 100 is a terminal device that is connected to the gateway 200 so as to perform data communication. The edge devices 100 are, for example, a network camera 100a that captures images such as moving images and still images, a sensor device 100b that acquires spatial data such as sunshine, temperature, and wind power, and environment data such as time data, a mobile terminal 100c and computer device 100d that are electric appliances such as a mobile phone, a portable information terminal, a tablet terminal, a personal computer, a netbook terminal, a slate terminal, an electronic dictionary terminal, a portable music player, or the like, a drone 100e such as an unmanned aerial vehicle, an unmanned mobile unit, or the like, and other goods.

The gateway 200 is a network device capable of data communication with the proposal computer 10, the edge devices 100, and the computer 300. The gateway 200 is, for example, a router, a computer device, or the like connectable to a LAN (Local Area Network) or a WAN (Wide Area Network).

The computer 300 is a computing device capable of data communication with the proposal computer 10 and the gateway 200.

First, the gateway 200 detects the edge devices 100 connected to the gateway 200 (step S01). The gateway 200 detects the network camera 100a, the sensor device 100b, the mobile terminal 100c, the computer device 100d, and the drone 100e connected via the LAN.

The gateway 200 transmits a data on the detected edge devices 100 to the proposal computer 10 (step S02).

The proposal computer 10 receives the data on the edge devices 100. The proposal computer 10 determines a combination of the edge devices 100 based on the received data (step S03). The proposal computer 10 determines the combination of the edge devices 100 connected to the gateway 200 based on this data and based on combinations of the edge devices 100 that have been stored as combination types in advance.

The proposal computer 10 acquires a device data on the detected edge devices 100 based on the received data relating to the edge devices 100 (step S04). The gateway 200 transmits identifiers (device names, serial numbers, device numbers, IP addresses, MAC addresses, or the like) and processing performances (the number of instructions that can be processed per unit time and a speed of executing various processes) of the edge devices 100 as the device data.

The proposal computer 10 determines a program for edge device 100 and a program for machine learning based on the determined combination and the acquired processing performances (step S05).

The proposal computer 10 transmits the determined program for edge device 100 to the edge devices 100 in accordance with the acquired processing performances, and transmits the determined program for machine learning to the computer 300 (step S06).

The edge device 100 receives the program for edge device 100, and the computer 300 receives the program for machine learning. The edge device 100 executes the program for edge device 100 in accordance with its own processing performance, and the computer 300 executes the program for machine learning (step S07).

The above is the overview of the edge device control system 1.

[System Configuration of Edge Device Control System 1]

Figure 2:
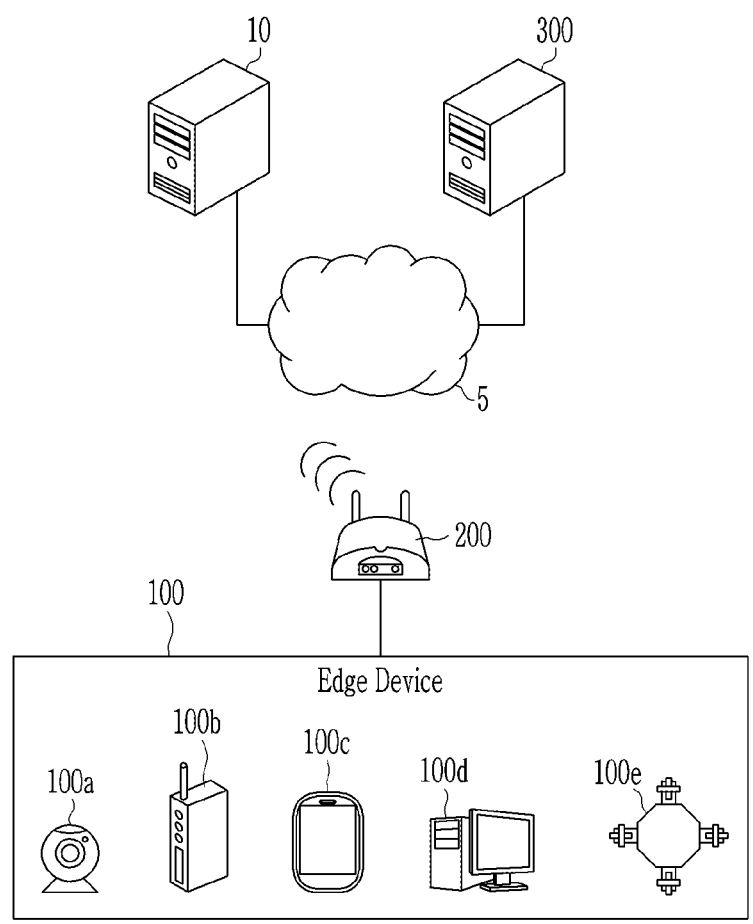
FIG. 2 is a diagram showing a system configuration of an edge device control system 1.

A system configuration of an edge device control system 1 which is an embodiment of the present invention is described with reference to FIG. 2. FIG. 2 is a diagram showing a system configuration of an edge device control system 1 which is an embodiment of the present invention. The edge device control system 1 includes a proposal computer 10, edge devices 100 (a network camera 100a, a sensor device 100b, a mobile terminal 100c, a computer device 100d, a drone 100e), a gateway 200, a computer 300, and a public line network 5 (the Internet network, third or fourth generation communication network, or etc.). The edge device control system 1 is a computer system that performs machine learning using the edge devices 100 connected to the gateway 200.

In addition, the number and types of the devices constituting the edge device control system 1 may be appropriately changed. Further, the edge device control system 1 may be realized not only by existing devices but also by virtual devices. Furthermore, each process to be described below may be realized by any one or a combination of two or more of the devices constituting the edge device control system 1.

The proposal computer 10 is the above-described computer device having functions to be described below.

The edge device 100 is the above-described terminal device having functions to be described below.

The gateway 200 is the above-described network device having functions to be described below.

The computer 300 is the above-described computing device having functions to be described below.

[Description of Functions]

Figure 3:
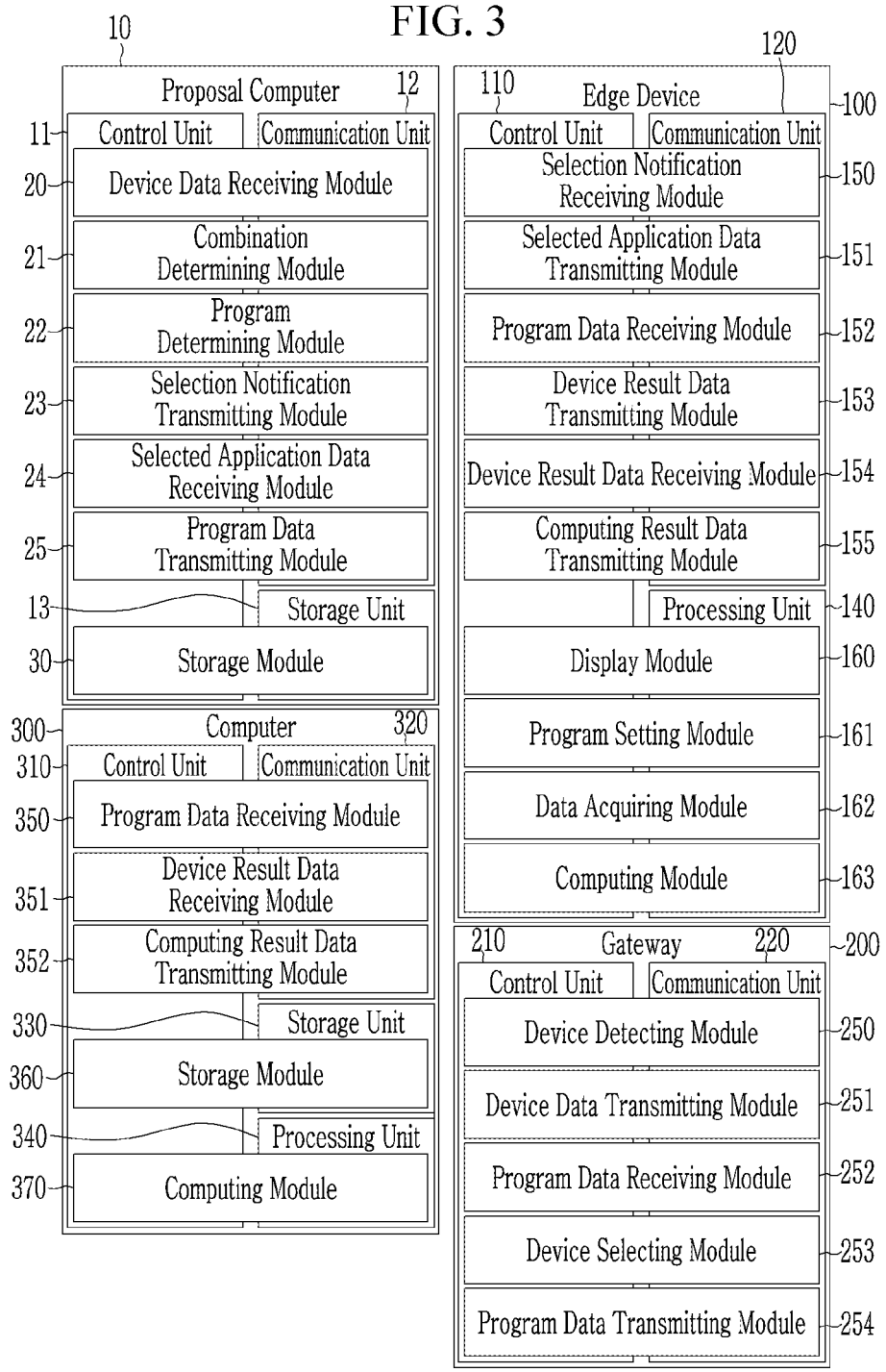
FIG. 3 is a functional block diagram of a proposal computer 10, an edge device 100, a gateway 200, and a computer 300.
Figure 4:
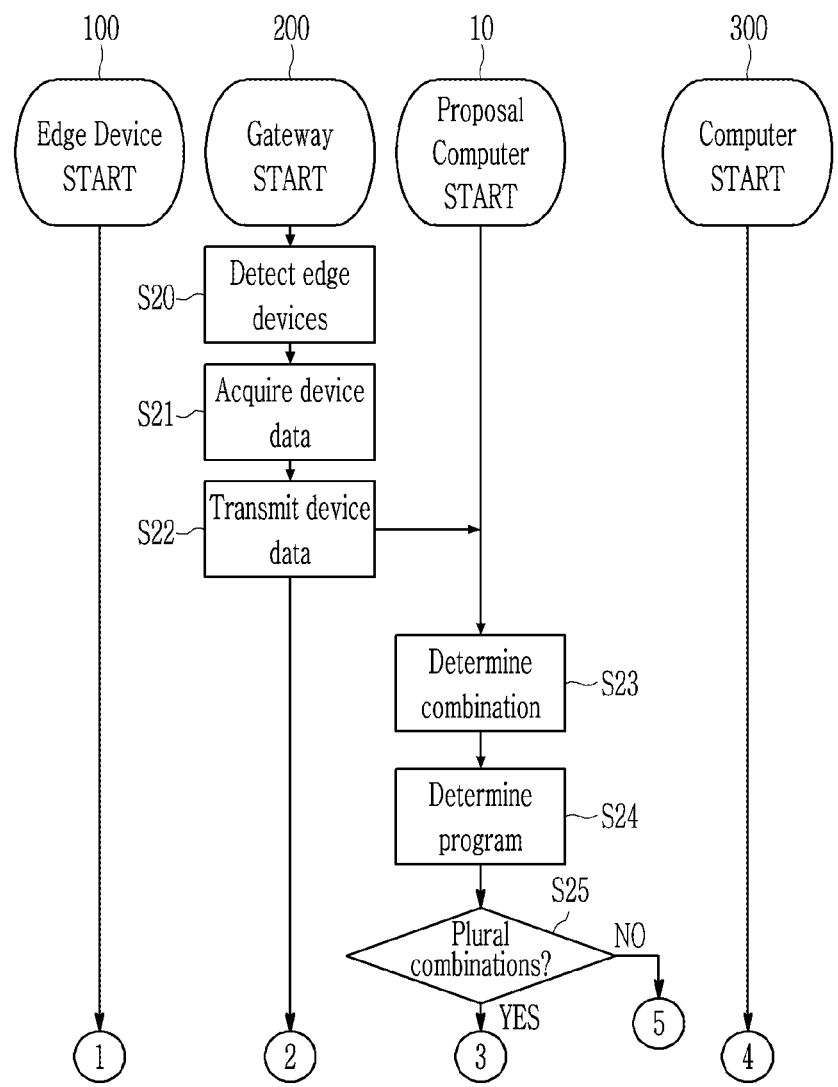
FIG. 4 is a flowchart showing a device detecting process executed by a proposal computer 10, an edge device 100, a gateway 200, and a computer 300.
Figure 5:
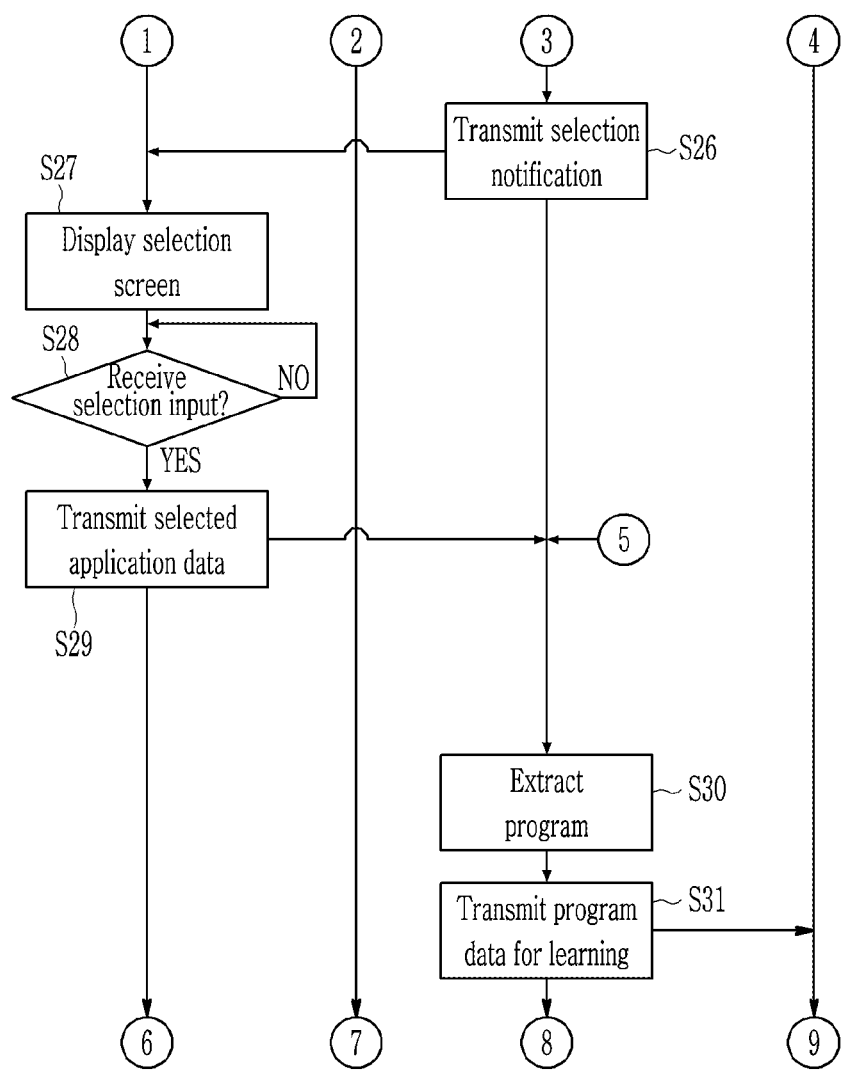
FIG. 5 is a flowchart showing a device detecting process executed by a proposal computer 10, an edge device 100, a gateway 200, and a computer 300.
Figure 6:
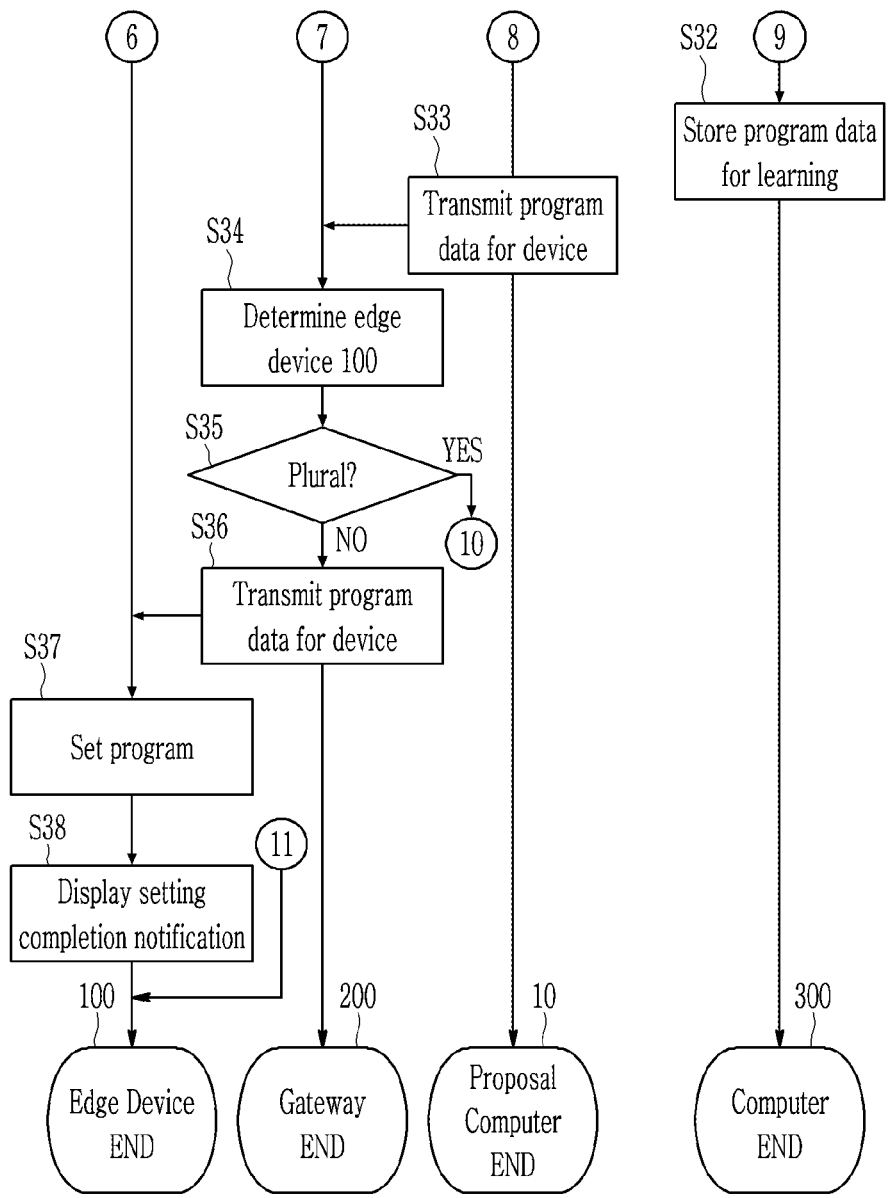
FIG. 6 is a flowchart showing a device detecting process executed by a proposal computer 10, an edge device 100, a gateway 200, and a computer 300.
Figure 7:
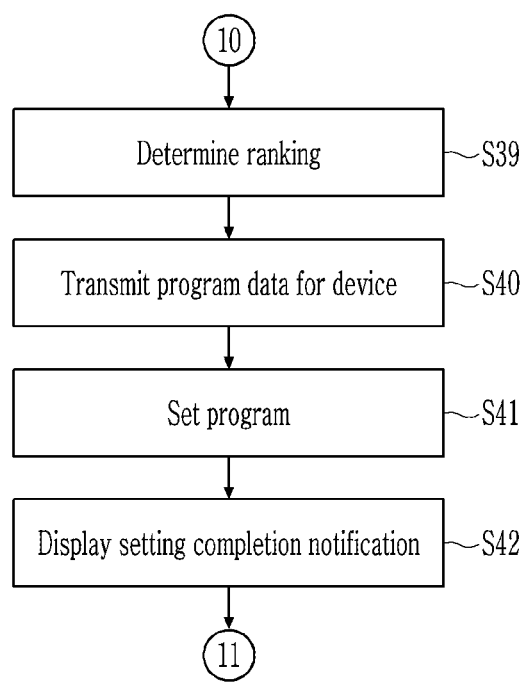
FIG. 7 is a flowchart showing a device detecting process executed by a proposal computer 10, an edge device 100, a gateway 200, and a computer 300.

Functions of an edge device control system 1 which is an embodiment of the present invention are described with reference to FIG. 3. FIG. 3 is a functional block diagram of a proposal computer 10, an edge device 100, a gateway 200, and a computer 300.

The proposal computer 10 includes, as a control unit 11, a CPU (Central Processing Unit), a RAM (Random Access Memory), a ROM (Read Only Memory), and the like. The computer 10 includes, as a communication unit 12, a device, for example a WiFi (Wireless Fidelity) compliant device conforming to IEEE 802.11 or the like, for enabling communication with other devices. In addition, the proposal computer 10 includes, as a storage unit 13, a data storage device such as a hard disk, a semiconductor memory, a recording medium, a memory card, or the like.

In the proposal computer 10, the control unit 11 reads a predetermined program, thereby realizing, a device data receiving module 20, a combination determining module 21, a program determining module 22, a selection notification transmitting module 23, a selected application data receiving module 24, and a program data transmitting module 25, in cooperation with the communication unit 12. In addition, in the proposal computer 10, the control unit 11 reads a predetermined program, thereby realizing a storage module 30 in cooperation with the storage unit 13.

Like the proposal computer 10, the edge device 100 includes a CPU, a RAM, a ROM, and the like as a control unit 110, and includes a device that enables communication with other devices as a communication unit 120. In addition, the edge device 100 includes, as a processing unit 140, various devices for acquiring environmental data, image data, and the like.

In the edge device 100, the control unit 110 reads a predetermined program, thereby realizing a selection notification receiving module 150, a selected application data transmitting module 151, a program data receiving module 152, a device result data transmitting module 153, a device result data receiving module 154, and a computing result data transmitting module 155, in cooperation with the communication unit 120. In addition, in the edge device 100, the control unit 110 reads a predetermined program, thereby realizing a display module 160, a program setting module 161, a data acquiring module 162, and a computing module 163, in cooperation with the processing unit 140.

Like the proposal computer 10, the gateway 200 includes a CPU, a RAM, a ROM, and the like as the control unit 210, and includes a device that enables communication with other devices as a communication unit 220.

In the gateway 200, the control unit 210 reads a predetermined program, thereby realizing a device detecting module 250, a device data transmitting module 251, a program data receiving module 252, a device selecting module 253, a program data transmitting module 254, in cooperation with the communication unit 220.

Like the proposal computer 10, the computer 300 includes a CPU, a RAM, a ROM, and the like as the control unit 310, a device that enables communication with other devices as a communication unit 320, and a data storage device as a storage unit 330. In addition, the computer 300 includes various devices for executing various programs as a processing unit 340.

In the computer 300, the control unit 310 reads a predetermined program, thereby realizing a program data receiving module 350, a device result data receiving module 351, and a computing result data transmitting module 352, in cooperation with the communication unit 320. In addition, in the computer 300, the control unit 310 reads a predetermined program, thereby realizing a storage module 360 in cooperation with the storage unit 330. Further, in the computer 300, the control unit 310 reads a predetermined program, thereby realizing a computing module 370 in cooperation with the processing unit 340.

[Device Detecting Process]

A device detecting process executed by an edge device control system 1 is described with reference to FIG. 4, FIG. 5, FIG. 6, and FIG. 7. FIG. 4, FIG. 5, FIG. 6, and FIG. 7 are flowcharts showing a device detecting process executed by a proposal computer 10, an edge device 100, a gateway 200, and a computer 300. The process executed by modules of each device described above is described in conjunction with the present process.

A device detecting module 250 detects an edge device 100 connected to itself (step S20). In step S20, the device detecting module 250 detects the edge device 100 connected via the LAN. The device detecting module 250 detects a network camera 100a, a sensor device 100b, a mobile terminal 100c, a computer device 100d, and a drone 100e as the edge devices 100.

The device detecting module 250 acquires a device data of the detected edge device 100 (step S21). In step S21, the device detecting module 250 acquires a unique identifier, a processing performance, and a line speed of the edge device 100 as the device data. The unique identifier of the edge device 100 is a device name, a manufacturing number, a device number, an IP address, a MAC address, or the like. In addition, the processing performance is the number of instructions that can be processed per unit time, a speed at which various processing is executed, or the like. The line speed is a communication speed of each device. The device detecting module 250 may acquire the device data from the detected edge device 100, or may acquire a necessary data from a computer or a database in a manufacturer or a vender of the edge device 100 based on a device name, a manufacture number, or a device number acquired from the edge device 100.

A device data transmitting module 251 transmits the acquired device data to the proposal computer 10 (step S22). Further, the process of step S21 and step S22 may be executed after step S23 to be described below.

A device data receiving module 20 receives the device data. A combination determining module 21 determines a combination of the edge devices 100 based on a combination database stored in advance in the storage module 30 (step S23). In step S23, the combination determining module 21 refers to the combination database to determine a combination type of the edge devices 100 included in the received device data.

[Combination Database]

The combination database stored in the storage module 30 is described with reference to FIG. 9. FIG. 9 is a diagram showing an example of the combination database. The storage module 30 stores a combination type and a plurality of edge devices 100 in association with each other. A type name is a name of the combination type. A device name is an identifier of the edge device 100. The storage module 30 stores type 1, type 2, and the like as the type names. The storage module 30 stores, as the device names, TOT-SE01 (tomato temperature sensor), CAM01 (camera), PH06 (smartphone), BB-01 (vinyl house sensor kit), WEBCAM25 (camera), GAL (tablet), and the like. The proposal computer 10 acquires and stores the combination database from the edge devices 100, other terminal devices, external computers, or the like in advance.

The number of the edge devices 100 included in the device name may be one or more, and may be appropriately changed. Further, the type name is not limited to the name shown in FIG. 9, but may be changed as appropriate. Furthermore, instead of classifying all combination types with one database, one database may exist for each combination type. That is, the same number of databases as the number of combination types may exist.

In step S23, the combination determining module 21 determines the combination type and determines the combination of the edge devices 100, by specifying the type name corresponding to the edge devices 100 included in the device data received this time. For example, since the edge devices 100 are the network camera 100a, the sensor device 100b, the mobile terminal 100c, the computer device 100d, and the drone 100e, the type 1 and the type 2 are determined as combination types corresponding to the edge devices 100.

A program determining module 22 determines programs for edge device 100 and a program for machine learning based on the determined combination, the acquired processing performances, and the acquired line speeds (step S24). In step S24, the program determining module 22 determines the programs for edge device 100 and the program for machine learning by referring to a program database. The programs for edge device 100 include a program for acquiring various data and a program for causing the edge devices 100 to execute the machine learning.

[Program Database]

The program database stored in the storage module 30 is described with reference to FIG. 10. FIG. 10 is a diagram showing an example of the program database. The storage module 30 stores a type name and a machine learning data set in association with each other. The type name is a name of the combination type described above. The machine learning data set is a name of a target application, a name of the program for the edge devices 100, and a name of a machine learning program. The storage module 30 stores type 1, type 2, and the like as the type names. The memory module 30 stores, as the machine learning data sets, "an application for tomato growing, a program set F for edge device, and a machine learning program B for computer", "an application for cucumber growing, a program set V for edge device, a machine learning program D for computer", and the like. A program necessary for executing each process is linked to the name of each program. The proposal computer 10 acquires and stores the program database from the edge devices 100, other terminal devices, external computers, or the like in advance.

The type name is not limited to the name shown in FIG. 10 and may be appropriately changed. Further, the name of the application, the name of the program for the edge device 100, and the name of the program for machine learning are not limited to the names shown in FIG. 10 and may be changed as appropriate. Furthermore, instead of classifying all the machine learning data sets with one database, one database may exist for each machine learning data set. That is, the same number of databases as the number of machine learning data sets may exist.

In step S24, the program determining module 22 determines a machine learning data set by extracting the machine learning data set associated with the combination type determined this time, and determines the name of the target application, the name of the program for edge device 100, and the name of the program for machine learning based on this machine learning data set, the processing performances, and the line speeds.

The program determining module 22 determines whether there are a plurality of determined combination types (step S25). In step S25, when the program determining module 22 determines that there are the plurality of determined combination types (YES in step S25), a selection notification transmitting module 23 transmits a selection notification to the edge device 100, such as the mobile terminal 100c or the computer device 100d, which can execute some notification to a user or can receive some input from the user on a display unit or an input unit (step S26). In step S26, the proposal computer 10 transmits the selection notification to the gateway 200, and the gateway 200 further transmits the selection notification to the edge device 100.

The selection notification receiving module 150 receives the selection notification. A display module 160 displays a selection screen based on the received selection notification (step S27).

Figure 11:
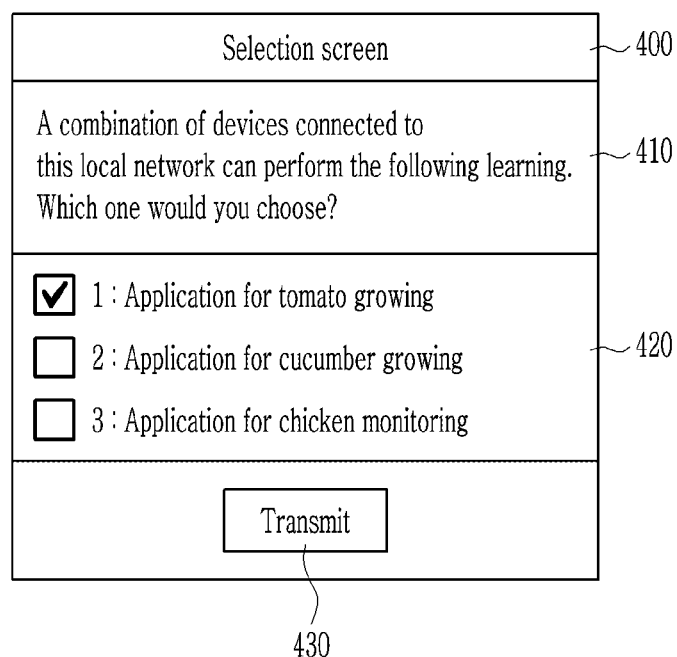
FIG. 11 is a diagram showing an example of a selection screen 400.

The selection screen displayed by the display module 160 is described with reference to FIG. 11. FIG. 11 is a diagram showing an example of the selection screen. A display module 160 displays a description display area 410, an application selection area 420, and a transmission icon 430 as the selection screen 400. The description display area 410 is an area for notifying that it is a screen for selecting an application. The display module 160 displays that "a combination of devices connected to this local network can perform the following learning. Which one would you choose?" The application selection area 420 is an area for displaying all of the above-described combination type. The display module 160 displays "1: application for tomato growing", "2: application for cucumber growing", and "3: application for chicken monitoring". The application selection area 420 receives an input from the user to accept a selection of one application. The display module 160 displays a selection icon 440 for one application on which the input has been received. The display module 160 displays a check mark as the selection icon 440. The transmission icon 430 accepts an input from the user, and a selected application data transmitting module 151 transmits the selected application as a selected application data to the proposal computer 10 by accepting the input.

The display contents, display mode, display position, display order, or the like of each area and the icon described above may be changed as appropriate. In addition, the application selection area 420 may accept selections for a plurality of applications.

The display module 160 determines whether a selection input is received (step S28). In step S28, the display module 160 determines whether the selection input of the application is received and the input of the transmission icon 430 is received. When determining that the selection input is not received (NO in step S28), that is, when the selection input of the application is not received, or the selection input of the application is received but the input of the transmission icon 430 is not received, the display module 160 repeats the present process until the selection input of the application and the input of the transmission icon 430 are received.

On the other hand, in step S28, when the display module 160 receives the selection input (YES in step S28), that is, when the display module 160 receives both the selection input of the application and the input of the transmission icon 430, the selected application data transmitting module 151 transmits to the proposal computer 100 the selected application data indicating the application on which the selection input has been received (step S29). In step S29, the edge device 100 transmits the selected application data to the gateway 200, and the gateway 200 transmits the selected application data to the proposal computer 10.

A selected application data receiving module 24 receives the selected application data.

On the other hand, in step S25, when the program determining modules 22 determines that there are not the plurality of determined combination types (NO in step S25) or the selected application data receiving module 24 receives the selected application data, the program determining module 22 extracts a program for edge device 100 and a program for machine learning which are included in a machine learning data set that is associated with one determined combination type or one combination type associated with the selected application data on which the selection input has been received by the edge device 100 (step S30). In step S30, the program determining module 22 extracts a program data linked to a name of the program for edge device 100 and extracts a program data linked to a name of the program for machine learning.

The program data transmitting module 25 transmits a program data for learning indicating the program for machine learning to the computer 300 (step S31).

The program data receiving module 350 receives the program data for learning. The storage module 360 stores the received program data for learning (step S32).

The program data transmitting module 25 transmits a program data for device indicating the program for edge device 100 to the gateway 200 (step S33).

The program data receiving module 252 receives the program data for device. Based on the device data, a device selecting module 253 determines the edge device 100 to perform machine learning based on the processing performances of the edge devices 100 and the line speeds of the LAN connection between the device selecting module and the edge devices 100 (step S34). In step S34, the device selecting module 253 determines the edge device 100 whose processing performance is equal to or higher than a predetermined performance and whose line speed is equal to or higher than a predetermined speed. In the present embodiment, the device selecting module 253 determines that the mobile terminal 100c and the computer device 100d are the edge devices 100 satisfying these conditions.

The device selecting module 253 determines whether there are a plurality of determined edge devices 100 (step S35). In step S35, when the device selecting module 253 determines that there are not the plurality of determined edge devices 100 (NO in step S35), the program data transmitting module 254 transmits the program data for device to the edge device 100 (step S36). In step S36, the program data for device including the program for machine learning is transmitted to the edge device 100 whose processing performance is equal to or higher than the predetermined performance and whose line speed is equal to or higher than the predetermined speed, and the program data for device including no program for machine learning is transmitted to the other edge devices 100.

A program data receiving module 152 receives the program data for device. A program setting module 161 sets a program for the edge device 100 based on the received program data for device (step S37). In step S37, the program is set for each edge device 100. That is, for example, the program for the edge device 100 for acquiring various data is set to the network camera 100a and the sensor device 100b, and the program for the edge device 100 for executing the machine learning is set to the computer device 100d.

The display module 160 displays a setting completion notification indicating that the program has been set (step S38). In step S38, when the program is set in the edge device 100 capable of execute some notification to the user or receiving some input from the user, the above-described setting completion notification is displayed on this edge device 100. Further, when no program is set in this edge device 100, the proposal computer 10 causes the edge device 100 connected to the gateway 200 to display the setting completion notification.

Figure 12:
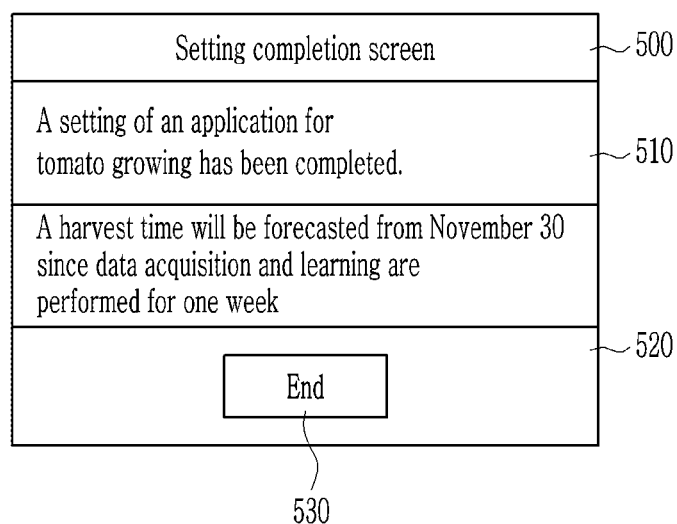
FIG. 12 is a diagram showing an example of a setting completion notification screen 500.

The setting completion notification displayed by the display module 160 is described with reference to FIG. 12. FIG. 12 is a diagram showing an example of the setting completion notification. The display module 160 displays a setting content notification area 510, a learning content notification area 520, and an end icon 530 as a setting completion notification screen 500. The setting content notifying area 510 is an area for notifying the contents relating to the program which has been set this time. The display module 160 displays a message "a setting of an application for tomato growing has been completed." The learning content notification area 520 is an area for notifying the learning contents and the contents relating to execution of the program. The display module 160 displays "a harvest time will be forecasted from November 30 since data acquisition and learning are performed for one week." The end icon 530 terminates the display of the setting completion notification screen by receiving an input from the user.

Further, the display contents, display mode, display position, display order, and the like of each area and the icon on the setting completion notification screen 500 may be appropriately changed.

On the other hand, in step S35, when the device selecting modules 253 determines that there are the plurality of determined edge devices 100 (YES in step S35), the device selecting module 253 determines rankings of these edge devices 100 based on the processing performances and the line speeds (step S39). The ranking is the order of the processing performance and the line speed. That is, the rankings are determined in the order of the edge device whose processing performance is high and whose line speed is fast, the edge device whose processing performance is high and whose line speed is low, the edge device whose processing performance is low and whose line speed is fast, and the edge device whose processing performance is low and whose line speed is low. For example, the rankings of the edge devices 100 are determined in the order of the computer device 100d and the mobile terminal 100c by the order of the processing performances and line speeds.

The program data transmitting module 254 transmits the program data for device to the edge device 100 (step S40). In step S40, the program data for device including the program for machine learning is transmitted to the computer device 100d, the program data for device including a program for machine learning in which some functions of the program for machine learning transmitted to the computer device 100d are restricted is transmitted to the mobile terminal 100c, and the program data for device including no program for machine learning is transmitted to the other edge devices 100.

The program data receiving module 152 receives the program data for device. The program setting module 161 sets a program for the edge device 100 based on the received program data for device (step S41). In step S41, the program is set for each edge device 100 in the same manner as in the above-described step S37. That is, for example, the program for the edge device 100 for acquiring various data is set to the network camera 100a and the sensor device 100b, and the program for the edge device 100 for executing the machine learning is set to the mobile terminal 100c and the computer device 100d.

The display module 160 displays a setting completion notification indicating that the program has been set (step S42). The process of step S42 is the same as the process of step S38 described above.

The above is the device detecting process.

[Machine Learning Process]

Figure 8:
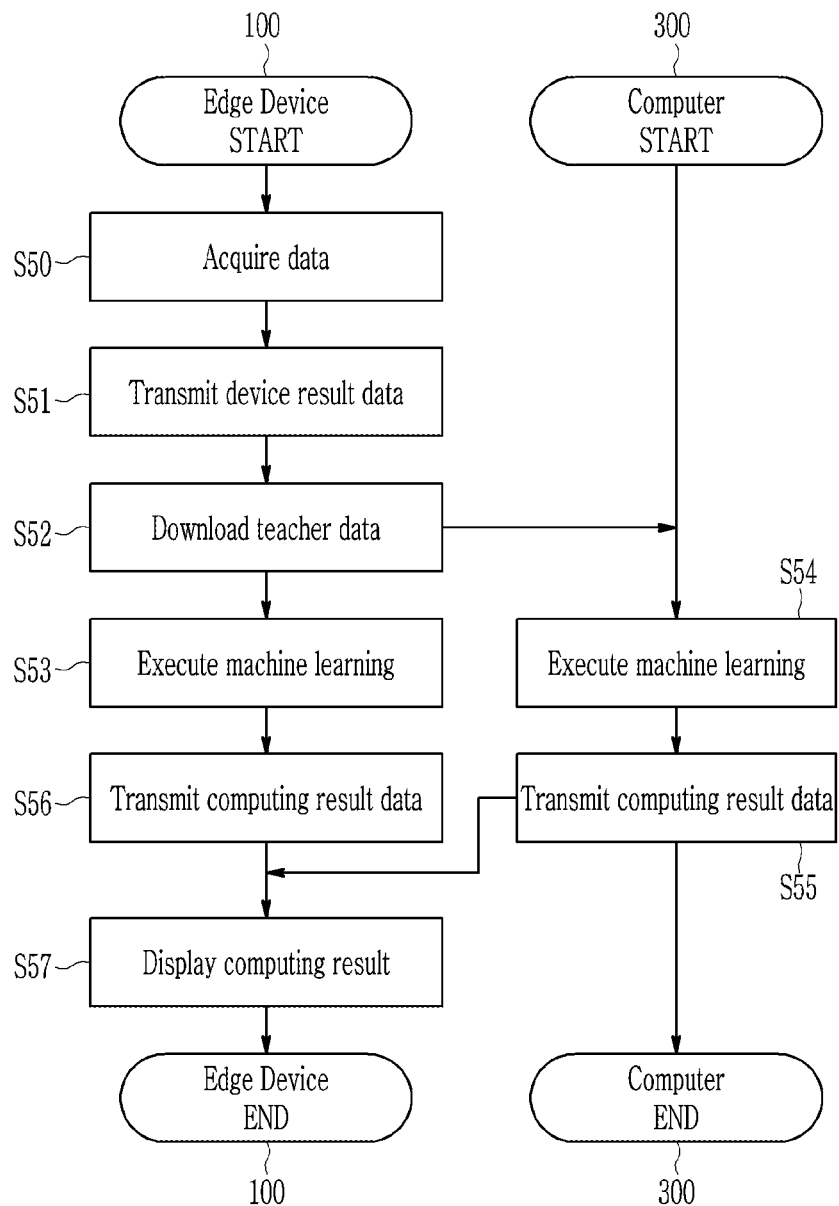
FIG. 8 is a flowchart showing a first machine learning process executed by an edge device 100 and a computer 300.

A machine learning process executed by an edge device control system 1 is described with reference to FIG. 8. FIG. 8 is a flowchart showing a machine learning process executed by an edge device 100 and a computer 300. The process executed by the module of each device described above is described in conjunction with the present process.

A data acquiring module 162 acquires various data (step S50). In step S50, the data acquiring module 162 acquires the various data based on a program for the edge device 100. For example, the data acquiring module 162 acquires an image data by imaging an image in a case of the network camera 100a, and acquires an environmental data in a case of the sensor device 100b.

A device result data transmitting module 153 transmits the acquired various data as a device result data to the computer 300 and the edge device 100 (step S51). In step S51, the edge device 100 transmits the device result data to the gateway 200, and the gateway 200 transmits the device result data to the computer 300. In addition, the device result data transmitting module 153 transmits the device result data to the mobile terminal 100c and the computer device 100d as the edge devices 100. At this time, the edge device 100 transmits the device result data to the gateway 200, and the gateway 200 transmits the device result data to the mobile terminal 100c and the computer device 100d.

A device result data receiving module 154 receives the device result data. A program data receiving module 152 downloads a teacher data corresponding to the received device result data (step S52). In step S52, the program data receiving module 152 downloads the teacher data from the proposal computer 10, the other computer device, the other terminal device, or the like.

A computing module 163 executes machine learning by executing a program for machine learning based on the downloaded teacher data and the device result data (step S53). In step S53, the computing module 163 changes execution contents of the program for machine learning according to the above-described ranking of the edge device 100. For example, all of the program for machine learning is executed on the edge device 100 having the highest ranking, a part of the program for machine learning is executed on the edge device 100 having a next ranking, and a part of the part of the program for machine learning is executed on the edge device 100 having the lower ranking.

A device result data receiving module 351 receives the device result data. A computing module 370 executes machine learning by executing the stored program for machine learning based on the received device result data (step S54).

A computing result data transmitting module 352 transmits to the edge device 100 a computing result data which is a result of executing the machine learning (step S55). In step S55, the computing result data transmitting module 352 transmits the computing result data to the edge device 100 capable of executing some notification to the user or receiving some input from the user as described above. Specifically, the computing result data is transmitted to the mobile terminal 100c and the computer device 100d. The computer 300 transmits the computing result data to the gateway 200, and the gateway 200 transmits the computing result data to the edge device 100.

A computing result data transmitting module 155 transmits to the edge device 100 the computing result data which is the result of executing the machine learning (step S56). In step S56, the computing result data transmitting module 155 transmits the computing result data to the edge device 100 capable of executing some notification to the user or receiving some input from the user as described above. Specifically, the computing result data is transmitted to the mobile terminal 100c and the computer device 100d. The computer 300 transmits the computing result data to the gateway 200, and the gateway 200 transmits the computing result data to the edge device 100.

The display module 160 displays a computing result based on the computing result data (step S57).

The above is the machine learning process.

The means and functions described above are realized by reading and executing a predetermined program by a computer (including a CPU, an information processing device, and various terminals). The program is provided, for example, in a form (SaaS: software as a service) provided from the computer via a network. Further, the program is provided, for example, in a form recorded in a computer-readable recording medium such as a flexible disk, a CD (e.g., CD-ROM or the like), a DVD (DVD-ROM, DVD-RAM, or the like), or the like. In this case, the computer reads the program from the recording medium and transfers the program to an internal storage unit or an external storage unit to be stored and executed. Furthermore, the program may be recorded in advance in a storage device (recording medium) such as a magnetic disk, an optical disk, an optical magnetic disk, or the like and be provided from the recording medium to the computer through a communications line.

While the embodiments of the present invention have been described above, the present invention is not limited to the above-described embodiments. In addition, the effects described in the embodiments of the present invention are merely a list of the most preferable effects produced by the present invention, and the effects of the present invention are limited to those described in the embodiments of the present invention.

DESCRIPTION OF REFERENCE NUMBERS

1: edge device control system, 10: proposal computer, 100: edge device, 200: gateway, 300: computer

What is claimed is:

1. A computer system for controlling edge devices connected to a gateway to perform machine learning, the computer system comprising:
   a detection unit that detects edge devices connected to the gateway;
   a combination determining unit that determines a combination type of the detected edge devices from among a plurality of combination types each indicating a combination of one or more edge devices;
   an acquiring unit that acquires processing performances of the detected edge devices;
   a program determining unit that determines programs for edge device and a program for machine learning based on the determined combination type and the acquired processing performances;
   a transmitting unit that transmits the determined programs for edge device to the edge devices in accordance with the acquired processing performances; and
   an executing unit that causes the edge devices to execute the programs for edge device in accordance with the acquired processing performances, and causes a predetermined computer to execute the program for machine learning,
   wherein the determined programs transmitted to an edge device satisfying a predetermined condition among the detected edge devices include a program for machine learning to be executed by the edge device satisfying the predetermined condition, and
   wherein the determined programs transmitted to an edge device satisfying no predetermined condition among the detected edge devices include no program for machine learning.

2. The computer system according to claim 1, further comprising:
   a downloading unit that controls the edge device to download a teacher data corresponding to the data; and
   a control unit that causes the edge device to perform machine learn on the data using the teacher data.

3. The computer system according to claim 1, wherein in a case where the acquired processing performance is high, the executing unit causes the edge device to execute a program for machine learning that can be activated by the edge device among the programs for edge device.

4. The computer system according to claim 1, wherein in a case where the acquired processing performance is high, the executing unit causes the edge device to execute a program for machine learning that can be activated by the edge device among the programs for edge device, together with the program for machine learning executed in the predetermined computer.

5. The computer system according to claim 1, wherein the predetermined condition includes a condition that the processing performance of the edge device is equal to or higher than a predetermined performance.

6. An edge device control method for controlling edge devices connected to a gateway to perform machine learning, the computer system comprising:
   detecting edge devices connected to the gateway;
   determining a combination type of the detected edge devices from among a plurality of combination types each indicating a combination of one or more edge devices;
   acquiring processing performances of the detected edge devices;
   determining programs for edge device and a program for machine learning based on the determined combination type and the acquired processing performances;
   transmitting the determined programs for edge device to the edge devices in accordance with the acquired processing performances; and
   causing the edge devices to execute the programs for edge device in accordance with the acquired processing performances, and causing a predetermined computer to execute the program for machine learning,
   wherein the determined programs transmitted to an edge device satisfying a predetermined condition among the detected edge devices include a program for machine learning to be executed by the edge device satisfying the predetermined condition, and
   wherein the determined programs transmitted to an edge device satisfying no predetermined condition among the detected edge devices include no program for machine learning.

7. The edge device control method according to claim 6, wherein the predetermined condition includes a condition that the processing performance of the edge device is equal to or higher than a predetermined performance.

8. A program, stored on a non-transitory recording medium, for causing a computer system for controlling edge devices connected to a gateway to perform machine learning, to execute to:
   detect edge devices connected to the gateway;
   determine a combination type of the detected edge devices from among a plurality of combination types each indicating a combination of one or more edge devices;
   acquire processing performances of the detected edge devices;
   determine programs for edge device and a program for machine learning based on the determined combination type and the acquired processing performances;
   transmit the determined programs for edge device to the edge devices in accordance with the acquired processing performances; and
   cause the edge devices to execute the programs for edge device in accordance with the acquired processing performances, and cause a predetermined computer to execute the program for machine learning,
   wherein the determined programs transmitted to an edge device satisfying a predetermined condition among the detected edge devices include a program for machine learning to be executed by the edge device satisfying the predetermined condition, and
   wherein the determined programs transmitted to an edge device satisfying no predetermined condition among the detected edge devices include no program for machine learning.

9. The program according to claim 8, wherein the predetermined condition includes a condition that the processing performance of the edge device is equal to or higher than a predetermined performance.

* * * * *